W. H. WARD.
MEASURING PUMP.
APPLICATION FILED OCT. 4, 1913.

1,117,729.

Patented Nov. 17, 1914.
2 SHEETS—SHEET 1.

WITNESSES
Edw. Thorpe
B. Joffe

INVENTOR
William H. Ward
BY Munn & Co
ATTORNEYS

W. H. WARD.
MEASURING PUMP.
APPLICATION FILED OCT. 4, 1913.

1,117,729.

Patented Nov. 17, 1914.

2 SHEETS—SHEET 2.

WITNESSES
Edw. Thorpe
B. Joffe

INVENTOR
William H. Ward
BY Munn&Co
ATTORNEYS

UNITED STATES PATENT OFFICE.

WILLIAM HENRY WARD, OF CUMBERLAND, MARYLAND.

MEASURING-PUMP.

1,117,729.   Specification of Letters Patent.   Patented Nov. 17, 1914.

Application filed October 4, 1913.   Serial No. 793,368.

*To all whom it may concern:*

Be it known that I, WILLIAM H. WARD, a citizen of the United States, and a resident of Cumberland, in the county of Allegany and State of Maryland, have invented a new and Improved Measuring-Pump, of which the following is a full, clear, and exact description.

The invention relates to fluid pumps for delivering determined quantities of liquid; and the object thereof is to provide a simple, strong and inexpensive measuring pump which will deliver different quantities of liquid by a simple manipulation of the pump. I obtain this object by providing a pump of the reciprocating type, the piston rod of which has means adapted to engage indicating means carried by an arm associated with the cylinder whereby different quantities of liquid can be made to be delivered by the pump.

The invention consists of the construction and combination of parts to be more fully described hereinafter and fully set forth in the claims.

Figure 1:
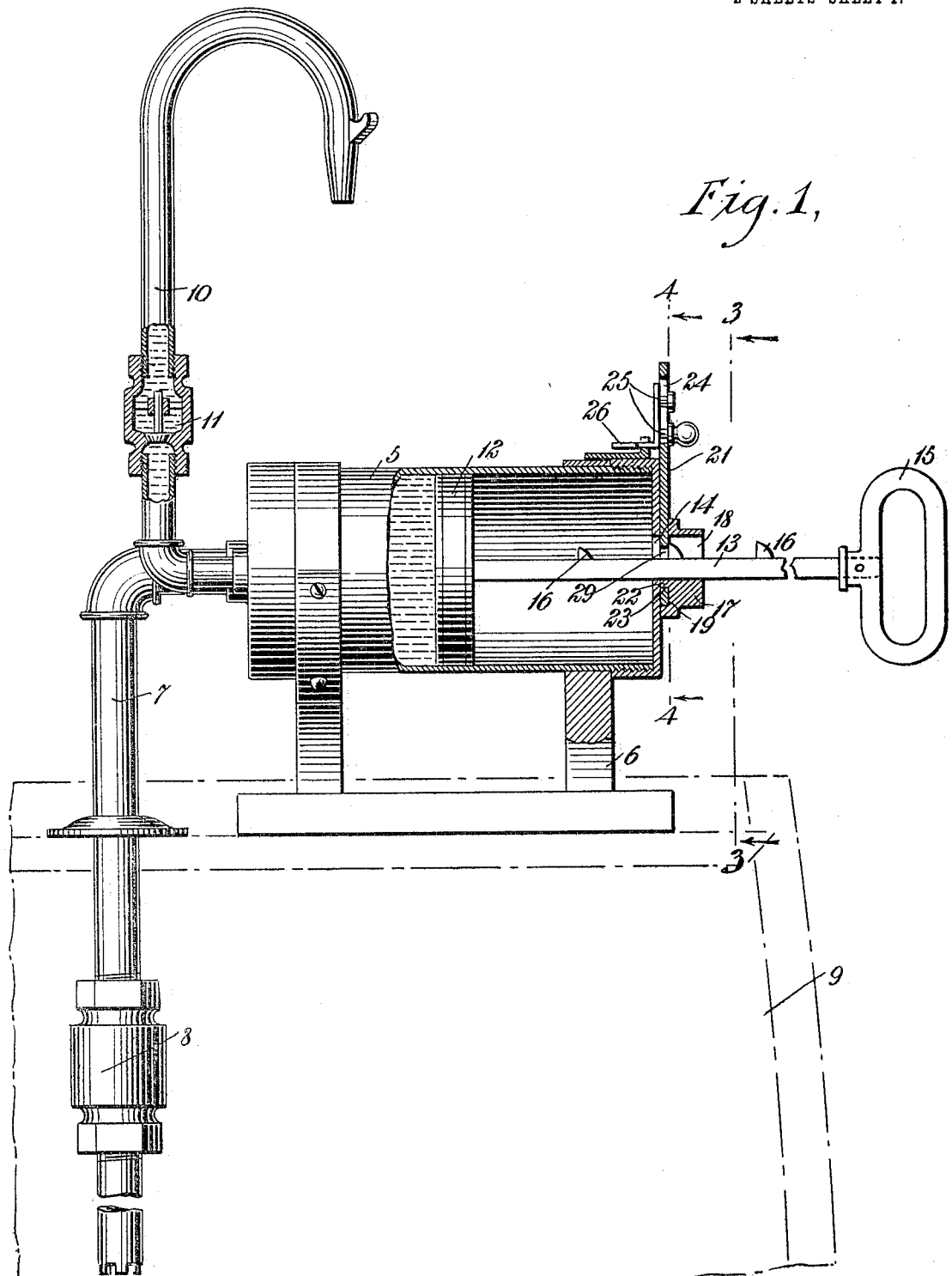
Figure 2:
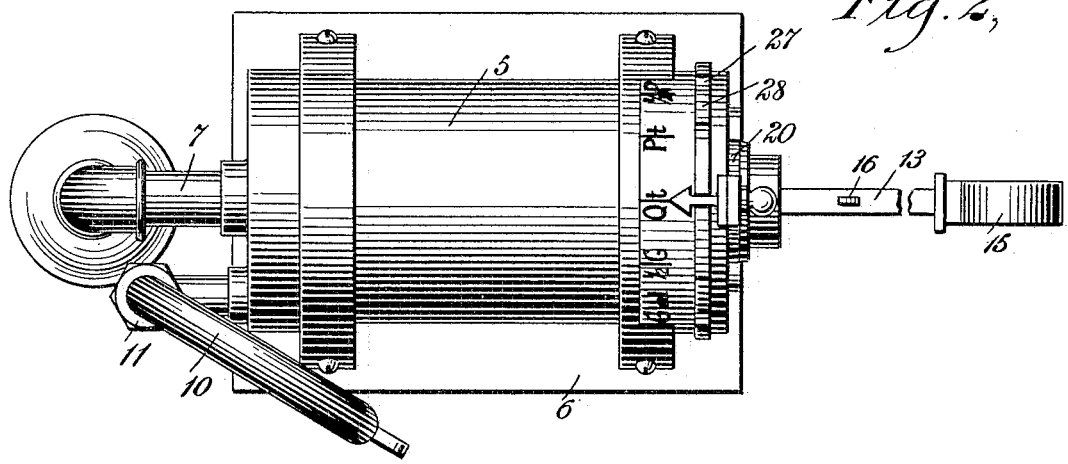
Figure 3:
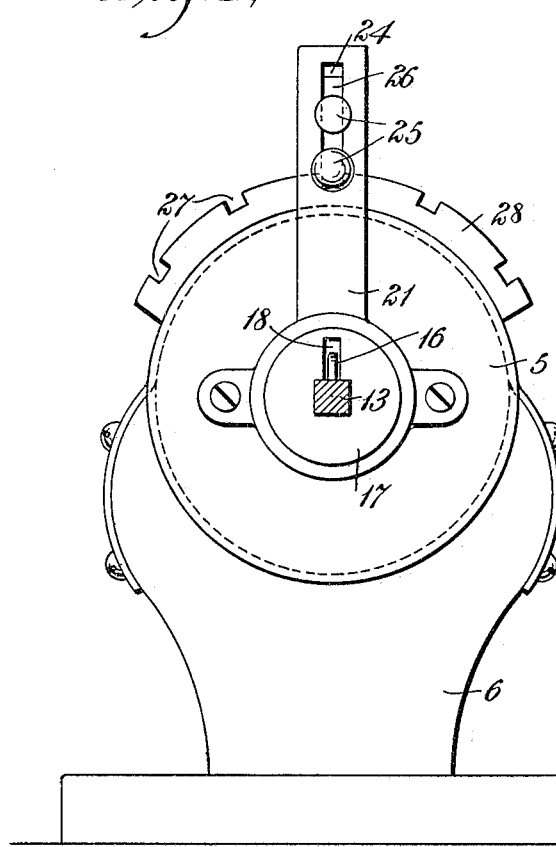
Figure 4:
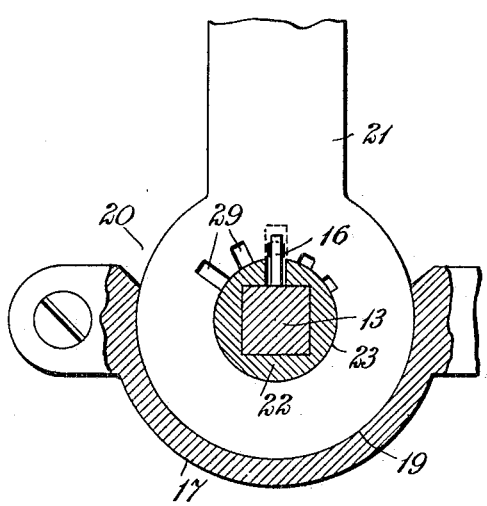

Reference is to be had to the accompanying drawings forming a part of this specification, in which like characters indicate corresponding parts in all the views and in which:

Figure 1 is a side elevation of an embodiment of my invention partly in section showing the details of construction; Fig. 2 is a plan view of the same; Fig. 3 is a section on the line 3—3, Fig. 1; and Fig. 4 is an enlarged section on line 4—4 of Fig. 1.

Referring to the drawings, 5 represents a cylinder mounted radially on an adequate base 6 in any suitable way. One end of the cylinder is provided with an inlet pipe 7, provided with a check valve 8 and having its end extending into the receptacle 9 which carries the supply and is shown in dotted lines in Fig. 1. The same end of the cylinder is also provided with an outlet or delivery pipe 10, also provided with a check valve 11. The purpose of these check valves is to prevent outflow through the intake pipe 7 when the piston 12 is on its delivery stroke, and through the delivery pipe 10 when the piston 12 is on its suction stroke.

The piston 12 is provided with a piston rod 13 of angular cross section projecting through a longitudinal aperture 14 provided in the outside end of the piston, whereby the rod 13 is constrained to reciprocate only. The projecting end of the rod is provided with a handle 15 by means of which the piston 12 is reciprocated in the cylinder 5. The rod 13 on one of its sides is provided with projections 16 of varying heights. The said projections increase in height from the piston to the handle, the purpose of which will appear hereinafter. The rod 13 also projects through a central aperture of a member 17 secured in any suitable way to the cylinder. The shape of the aperture in the member 17 is similar to the cross section of the rod 13. The member 17 is also provided with a slot 18 in alinement with the projections 16 and through which the same can slide without interference. The member 17 at the face contacting with the end of the cylinder is provided with an annular recess 19, a portion of which recess is partly eliminated by a cut-out 20 formed in the lateral surface of the member 17, through which cut-out projects the arm 21 engaged in the recess 19. The collar 22 formed by the recess 19 engages the central aperture 23 of the arm 21, and on which collar said arm 21 is adapted to rotate. As seen in Figs. 1 and 2 the arm 21 is mounted between the end of the cylinder and the member 17, and is mounted to rotate on the collar 22 of the said member.

The end of the arm extending above the lateral surface of the cylinder is provided with a longitudinal groove 24 disposed radially with reference to the center of the cylinder and engaged by pins 25 secured in a pointer 26, whereby said pointer is mounted to slide in the groove 24. (See Figs. 1 and 3.) The pointer 26, a portion of which is bent laterally extending parallel to the elements of the lateral surface of the cylinder, is adapted to engage radially disposed notches 27 provided on a sector 28 secured, preferably, to the lateral surface of the cylinder. One of the pins 25 is provided with a head whereby the pointer can be moved in the groove 24, thereby bringing it in engagement with the notches of the sector or disengaging it from the same. When the pointer 26 is made to engage a notch on the sector, the arm 21 is locked to the cylinder.

The arm 21 at the central aperture 23 is provided with radial notches 29 of different depths. These notches 29 are brought in alinement with the projections 16 on the rod when the pointer 26 is made to engage the notches 27 in the sector, each of the notches of the sector bringing a predetermined notch 29 into alinement with the projections. The notch 29 in alinement with the projections 16, according to its depth, will allow the passage of such projections 16 which have their height less than the depth of the notch, and, therefore, the movement of the piston in the cylinder will depend on the notch in alinement with the projections. The sector 28 is provided with a lateral extension on which is indicated in alinement with each notch 27 the amount of liquid that will be delivered by the movement of the piston when the pointer engages a notch.

The use of my device is as follows: The piston 12, by means of the handle 15, is made to move toward the end where the arm 21 is positioned, thus filling the cylinder 5 completely with the liquid through the inlet pipe 7. By means of the pointer 26 the arm 21 is locked into the position for delivering the desired quantity of liquid. As, for example, as shown in Fig. 4, the pointer places the arm 21 for delivering one quart. The piston 12 is then forced toward the opposite end of the cylinder until the same is prevented from further movement by the engagement of the proper projection with the arm 21. It is understood that the proper position of the projection 16 on the rod 13 is determined by the voluminal displacement of the piston in the cylinder. It is understood that fractional parts of the total volume of the cylinder can be delivered without completely filling the cylinder every time, in which case the arm 21 will be displaced accordingly to obtain the desired amount of liquid.

Having thus described my invention, I claim as new and desire to secure by Letters Patent:

1. In a measuring pump, a cylinder having a valve-controlled inlet and a valve-controlled outlet at one end thereof; an arm pivotally mounted at the opposite end of the cylinder and axial with the same, said arm having a radial slot at its free end; a pointer mounted to slide in said slot; a sector on the lateral surface of the cylinder having notches adapted to be engaged by said pointer and whereby said arm is locked to the cylinder; a piston in the cylinder; an angular piston rod projecting through the end of the cylinder and said arm and whereby said piston can only be reciprocated in said cylinder; alining projections of varying heights on said rod, the height of the projections increasing from the piston toward the projecting end of the rod, said arm having radially disposed notches of different depths, each adapted to be brought in alinement with said projections by the engagement of the pointer with the notches in the sector and whereby the alining notches will only let pass the projections on the rod having their height less than the depth of the notch in alinement with the projections, whereby a predetermined amount of liquid will be delivered by the movement of the piston.

2. In a measuring pump, a cylinder having a valve-controlled inlet and a valve-controlled outlet at one end thereof; an arm pivotally mounted at the opposite end of the cylinder and in the axis of the same; a pointer slidably mounted on said arm; means on the cylinder adapted to be engaged by said pointer and whereby said arm can be locked to the cylinder at different predetermined positions; a piston in the cylinder; an angular piston rod projecting through the end of the cylinder and the arm; projections on the same side of said rod and in alinement with each other, said projections being of varying heights, the height of which projections increases from the piston toward the projecting end of the rod, said arm having radially disposed notches of different depths, each adapted to be brought in alinement with said alining projections by the engagement of said pointer with the means on the cylinder whereby the movement of the piston in the cylinder is controlled.

3. In a measuring pump, a cylinder having a valve-controlled inlet and a valve-controlled outlet at one end; a piston in the cylinder; a piston rod of angular cross section projecting through the opposite end of the cylinder; a member on said piston rod and secured to said cylinder whereby said piston rod is constrained to reciprocate only; an arm rotatably mounted in said member between the same and the end of the cylinder; a pointer associated with said arm and slidably mounted in the same; a sector on said cylinder having means adapted to be engaged by the pointer and whereby said arm is maintained in different predetermined positions; alining projections of different heights on the same side of the rod, said projections increasing in height from the piston to the projecting end of the rod, said member having a slot in alinement with said projection, and said arm having radially disposed slots of different depths, each adapted to be brought in alinement with said projections by the engagement of said pointer with the means in the sector and whereby the movement of the piston in the cylinder is controlled, substantially as and for the purpose set forth.

In testimony whereof I have signed my name to this specification in the presence of two subscribing witnesses.

WILLIAM HENRY WARD.

Witnesses:
JAMES C. SHRIVER,
NELLIE BRADY.